F. NOTZ & G. ROYAN.
BELT SHIFTER.
APPLICATION FILED JULY 25, 1907. RENEWED FEB. 20, 1909.
917,480.
Patented Apr. 6, 1909.
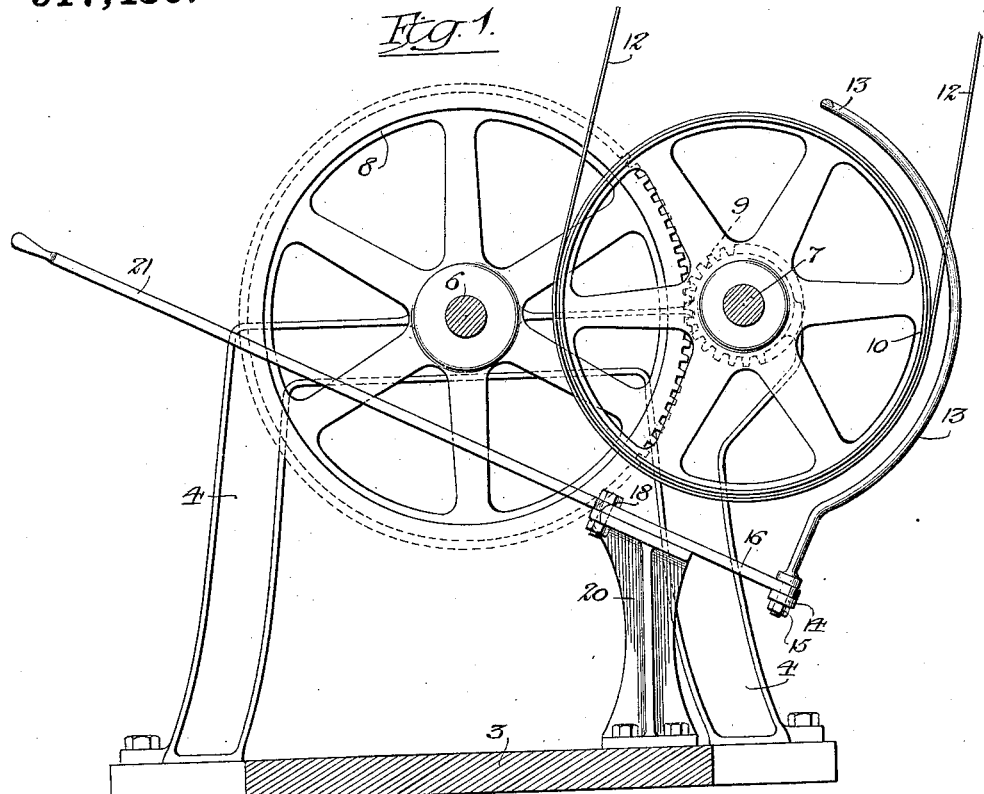
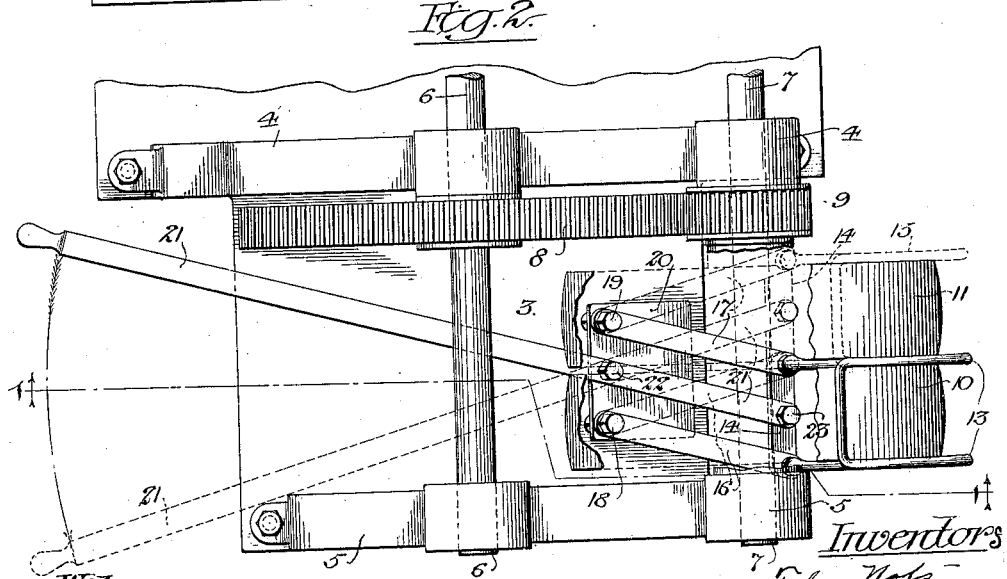

UNITED STATES PATENT OFFICE.

FELIX NOTZ AND GEORGE ROYAN, OF CHICAGO, ILLINOIS; SAID ROYAN ASSIGNOR TO SAID NOTZ.

BELT-SHIFTER.

No. 917,480.    Specification of Letters Patent.    Patented April 6, 1909.

Application filed July 25, 1907, Serial No. 385,447. Renewed February 20, 1909. Serial No. 479,271.

*To all whom it may concern:*

Be it known that we, FELIX NOTZ, a citizen of the United States, residing at Chicago, in the county of Cook and State of Illinois, and GEORGE ROYAN, a subject of the King of Great Britain, residing at Chicago, in the county of Cook and State of Illinois, have invented certain new and useful Improvements in Belt-Shifters, of which we do declare the following to be a full, clear, and exact description, reference being had to the accompanying drawing, forming part of this specification.

The present invention has for its object to provide a belt shifter that shall be simple, cheap and effective in construction and that shall be adapted for use in a variety of situations.

The invention consists in the features of novelty hereinafter described, illustrated in the accompanying drawing and more particularly pointed out in the claims at the end of this specification.

Figure 1 is a view in vertical section on line 1—1 of Fig. 2. Fig. 2 is a plan view, parts being broken away for better illustration.

3 designates the base of the machine from which rise standards 4 and 5 whereon are mounted the shafts 6 and 7, these shafts being shown as connected together by gear wheel 8 and pinion 9. On the shaft 7 are mounted the fixed and loose pulleys 10 and 11 of any suitable size and shape, and over the fixed pulley 10 extends a driving belt 12.

The improved belt shifting mechanism next to be described may be applied in a variety of situations. As shown, this mechanism comprises a shifting fork 13, of any convenient shape, adapted to engage the belt 12, the belt being shown as extended through the arms of the fork. The lower ends of the fork 13 are shown as mounted upon and passing through a suitable bar or fork carrier 14, the extreme ends of the fork 13 being screw-threaded and being provided with nuts 15 to hold the fork in position. As shown, also, the lower ends of the fork 13 pass through the ends of links 16 and 17 which are thus pivotally connected to the bar 14. The opposite ends of the links 16 and 17 are shown pivoted as at 18 and 19 to a support or pedestal 20 that is bolted to and rises from the base 3 of the machine.

Intermediate between the links 16 and 17 extends the shifting lever 21 that is pivoted as at 22 to the top of the support or pedestal 20 and the extreme rear end of the lever 21 is pivoted as at 23 to the bar 14. The lever 21 is shown as extending forwardly to the front of the machine so that the operator may from such point conveniently shift the belt 12 from the fast to the loose pulley, and vice versa. If desired, means may be employed for holding the lever 21 in its different positions, but this is not regarded as essential to the invention. As the operating lever 21 is shifted, the bar 14 that carries the fork 13 will, as it is moved, remain substantially parallel to the shaft 7 whereon the pulleys 10 and 11 are mounted, this parallelism of the bar 14 being secured by the parallel links connecting it with the pedestal or support 20. Manifestly, the number and length of the links connecting the bar 14 to the pedestal or support is not essential, and a proper movement of the bar 14 could be effected, even if one of the links 16 or 17 were omitted, in which case the rear portion of the operating lever 21 would perform the function of such link.

It is obvious that the precise details of construction above set out may be varied without departing from the scope of the invention, these details depending upon the position in which the pulleys 10 and 11 are placed and in which the belt 12 is run.

Having thus described our invention, what we claim as new, and desire to secure by Letters Patent, is:—

1. A belt shifter comprising a support, a shifting lever pivotally mounted upon said support and having a free end extending forwardly therefrom to the front portion of the machine, a fork carrier pivotally connected to the rear end of said shifting lever, a link pivotally connected to said fork carrier and to said support and a shifting fork connected to said fork carrier at opposite sides of said lever.

2. A belt shifter comprising a support, a shifting lever pivotally mounted upon said support and having its free end extending forwardly therefrom and formed as a handle to be grasped by the operator, a fork carrier pivotally connected to the rear end of said shifting lever, links pivotally connected to said support and to said fork carrier on opposite sides of said shifting lever and a shifting fork fixed to said fork carrier.

FELIX NOTZ.
GEORGE ROYAN.

Witnesses:
GEO. P. FISHER, Jr.,
KATHARINE GERLACH.